United States Patent
Dieguez Garcia

(10) Patent No.: US 11,440,309 B2
(45) Date of Patent: Sep. 13, 2022

(54) METHOD FOR TRIM PREPARATION OF CAR INTERIOR PARTS AND TRIM AS PREPARED

(71) Applicant: Aurelio Dieguez Garcia, Mos (ES)

(72) Inventor: Aurelio Dieguez Garcia, Mos (ES)

( * ) Notice: Subject to any disclaimer, the term of this patent is extended or adjusted under 35 U.S.C. 154(b) by 305 days.

(21) Appl. No.: 16/463,153

(22) PCT Filed: Nov. 2, 2017

(86) PCT No.: PCT/ES2017/070728
§ 371 (c)(1),
(2) Date: May 22, 2019

(87) PCT Pub. No.: WO2018/096194
PCT Pub. Date: May 31, 2018

(65) Prior Publication Data
US 2019/0275959 A1    Sep. 12, 2019

(30) Foreign Application Priority Data

Nov. 22, 2016   (ES) ................................ ES201631494

(51) Int. Cl.
*B32B 38/00*    (2006.01)
*B60R 13/02*    (2006.01)
(Continued)

(52) U.S. Cl.
CPC ........ *B32B 38/0004* (2013.01); *B29C 43/183* (2013.01); *B29C 70/345* (2013.01);
(Continued)

(58) Field of Classification Search
CPC .............. B32B 37/12; B32B 2038/166; B32B 2038/168; B32B 2037/243; B32B 38/164; B32B 38/0004; B32B 2305/18; B32B 2309/02; B32B 2309/105; B29C 70/345; B29C 70/08; B29C 70/46; B29C 65/70;
(Continued)

(56) References Cited

U.S. PATENT DOCUMENTS

2003/0089192 A1*  5/2003  Shimizu ................ B29C 70/46
                                                          74/552

FOREIGN PATENT DOCUMENTS

EP    1442957 A1    8/2004
EP    1989959 A1   11/2008
(Continued)

OTHER PUBLICATIONS

Machine translation of ES 220649 date unknown.*
(Continued)

*Primary Examiner* — John L Goff, II
(74) *Attorney, Agent, or Firm* — Kolisch Hartwell, P.C.

(57) ABSTRACT

A method for trim preparation of car interior parts includes the steps of cutting out templates of natural jute or linen fabric primer and a second natural cotton fabric or fiber paper, and impregnation of the fabrics with a water-based adhesive resin in each of the fabrics and drying thereof. The method also includes the steps of fabric pressing, forming a structure by adding an adhesive layer and a decorative sheet, applying primer on the decorative layer and drying it, and applying at least one layer of varnish onto the primer layer and drying it.

11 Claims, 2 Drawing Sheets

(51) Int. Cl.
  *B62D 1/06* (2006.01)
  *B32B 37/00* (2006.01)
  *B29C 43/18* (2006.01)
  *B32B 37/12* (2006.01)
  *B29C 70/34* (2006.01)
  *B29C 43/00* (2006.01)
  *B29C 70/08* (2006.01)
  *B32B 1/00* (2006.01)
  *B32B 21/08* (2006.01)
  *B32B 37/24* (2006.01)

(52) U.S. Cl.
  CPC .............. *B32B 37/00* (2013.01); *B32B 37/12* (2013.01); *B60R 13/02* (2013.01); *B62D 1/06* (2013.01); *B29C 43/00* (2013.01); *B29C 70/08* (2013.01); *B32B 1/00* (2013.01); *B32B 21/08* (2013.01); *B32B 38/164* (2013.01); *B32B 2037/243* (2013.01); *B32B 2305/18* (2013.01); *B32B 2309/02* (2013.01); *B32B 2309/105* (2013.01)

(58) Field of Classification Search
  CPC ........... B29C 66/547; B29L 2031/3047; B29L 2031/3041; B62D 1/06; B60R 13/02; Y10T 156/1044; Y10T 156/1062; Y10T 156/1075; Y10T 156/1074
  USPC .......................................................... 74/522
  See application file for complete search history.

(56) References Cited

FOREIGN PATENT DOCUMENTS

| ES | 220649 A1 | 3/2004 |
|---|---|---|
| WO | 2004073968 A2 | 9/2004 |
| WO | 2015055869 A1 | 4/2015 |

OTHER PUBLICATIONS

Sanz, M. Bautista, Authorized Officer, Spanish Patent and Trademark Office, "International Search Report" in connection with related International Application No. PCT/ES2017/070728, dated Feb. 26, 2018, 3 pgs.

* cited by examiner

METHOD FOR TRIM PREPARATION OF CAR INTERIOR PARTS AND TRIM AS PREPARED

TECHNICAL FIELD

This invention refers to the method of trim preparation formed by several fabrics for car interior parts, such as bevelling pieces, steering wheels, armrests, etc., as well as the trim as prepared.

BACKGROUND

Currently, trims used for car interior parts are based on technologies that use glass fibre, fibres conglomerated with acrylic resins, injected plastic or laminated wood. For example, US2003089192 refers to a wood-based trim for car steering wheel. JP2001113621 discloses a process to manufacture steering wheels that include the formation of an outer laminate comprised of reinforcing layer consisting of resin fibres and a decorative layer located on the reinforcing layer.

The trims used so far do not always have the optimal properties in terms of thermal and electrical conduction and their behaviour is not always isotropic in this sense. The car interior parts trimmed with the currently known trims also do not have good capacitive properties, either because of their thickness or their composition, so that the parts cannot be easily linked to a capacitive sensor, something which is essentially vehicle with "autodrive" (fully automated vehicles), wherein parts such as a steering wheel can be provided with capacitive sensors to detect whether or not there is contact with the steering wheel. The magnetic field generated by a capacitive sensor would not exceed the conventional trim, so its application would not be possible in this sense.

It is also known the state of the art of the document ES2300558T that discloses a steering wheel composed of thermoplastics with a base structure and at least one outer covering element, wherein the trim element is comprised of a structural layer containing reinforcing fibres and an outer layer having a decorative function.

Another document related to the object of the application is the patent ES2200649 A1 that is comprised of a method for trimming car interior parts with wood or similar products and includes the pressed steps and conformed separately by a wood fibre and natural fibre blanket and on the other side, a sheet of natural wood.

None of the above two cases it is possible to simultaneously produce a trim in which the final forming takes place simultaneously on the base part and the decorative sheet due to the adhesives and resins employed, the molding temperatures and pressures and also the sheet thickness.

This invention is an improvement over the known trim for car interior parts with very resistant, very low thickness and with excellent electrical insulation properties, very good thermal conductivity and with a magnetic permeability close to 1, not affecting the magnetic fields generated by capacitive or inductive sensors, except for the thickness. Therefore, the trim obtained by the described process has properties suitable for present and future application, for example, in cars with sensors that need to detect whether the driver is in contact with the steering wheel or not and also in cars that require quick heating of the interior parts, such as the steering wheel.

DESCRIPTION OF THE INVENTION

The method for trim preparation of car interior parts includes the following steps:

reception of material to be used comprising a jute or natural linen fabric primer and a second natural cotton or fibre-cloth fabric, fibre paper comprises cellulose and multidirectional synthetic microfibres that provide elasticity and strength, these fibres may be, for example, latex, preferably the paper fibre comprised of 90% of cellulose and 10% of multidirectional synthetic microfibres, the thickness of the first fabric may range from 0.1 to 0.8 mm and the thickness of the second fabric may range from 0.05 mm to 0.1 mm;

cutting of fabric insoles with the appropriate size and shape of the piece to be trimmed; this step can be performed by a laser or cutting plotter;

impregnation of the fabrics with a water-based adhesive resin and drying thereof, the resin can be applied by a spray and/or rollers and the drying is carried out in an oven, preferably between 30° C. and 50° C. for a time which may vary between 30 minutes and 48 hours, the water-based resin exhibits chemical compatibility with the fabrics used so that it can easily penetrate into them. The resin not only allows the fabrics to stick together, but also gives them suitable plasticity and homogeneity properties to meet the required physical and chemical properties; the resin may be acrylic, vinyl epoxy, polyurethane, etc. and preferably the pH thereof is less than 7, which facilitates its penetration and interaction with the tissues;

pressing the two impregnated fabrics into a pressed structure that comprises the first and the second fabrics; this pressing is preferably carried out in a hot plate press, at temperatures between 245° C. and 265° C.;

formed of a structure to give the shape of the part to be trimmed, for which an adhesive layer is applied in advance on one of the faces of the pressed structure formed in the previous stage and an adhesive sheet is glued on the decorative layer that can be made of wood, fibreglass, plastic material, etc.; the adhesive may be acrylic, polyurethane or water-based or solvent-based epoxy; this forming is preferably carried out in a hot plate press having the required shape, at temperatures between 100° C. and 120° C.; the thickness of the decorative sheet may range from 0.2 to 0.6 mm;

application of a layer of primer on the decorative sheet of the structure formed in the previous step and drying thereof; the primer may be acrylic, polyurethane or solvent-based or water-based epoxy; the drying is preferably carried out at a temperature between 18-25° C.;

application of at least one layer of varnish on the primer layer and drying thereof; the drying of the lacquer layer is preferably carried out in an oven at temperatures between 10 and 110° C. and for a time that may vary between 1 and 10 hours.

Several layers of varnish can be applied depending on the required final thickness. The varnish may be polyurethane-based and can also be polyester or acrylic-based.

Subsequently, a cutting step can be carried out to eliminate surplus material, in case the final size exceeds the size of the piece to be trimmed or the different layers are not exactly the same. The cutting facilitates the assembly of the trim on the part to be trimmed.

The trimming thus formed, which will have a thickness between 1.1 mm and 1.6 mm, can be marketed as a semi-finished piece easy to assemble into the part to be trimmed. In addition, the varnish layer provides protection against external agents and also makes it dimensionally stable.

In order to assemble the trim on the piece to be trimmed, this trim is bonded by a bonding resin on the piece to be trimmed. Preferably, this assembly is carried out in a hot plate press at a temperature between 100° and 120° C.

The trim already provided on the workpiece is trimmed with at least one layer of varnish, and then it is sanded and polished, thereby obtaining the trimmed end piece.

This invention also relates to the coating obtained by the process followed in the present invention.

Natural fabrics are transformed by the process of this invention into hard-crystallized plastics materials of low thickness, being heat-resistant, heat-resistant and having good mechanical properties. Precisely, the combination of the natural fabrics used together with the water-based resin and subsequent pressing, forming and drying treatments results in a super-resistant coating of very low thickness with optimum conductive and capacitive properties as well as excellent insulation electrical for the application being pursued.

That is, the trimming of car interior parts uses more and more materials compatible with sensors that require input or output and precise output at the level of thermal and electrical conductivity and capacitance. This compatibility is conferred by the chemical association of the fabric with the water-based resin, generating a structure with practically isotropic characteristics.

The method used also implies a reduction of the known processes, making it economically viable. On one hand, the fabrics used are economic and can be disposed of in large quantities and, on the other hand, it is only necessary to make a forming step. In contrast, conventional processes for the trim manufacture for car interior parts require two or more forming stages, at least a first stage would form the base of the trim and the second would form the final trim, including a decorative wood sheet or other material.

On the other hand, when a multi-part trim is required to cover a part, such as steering wheel, the various trimming parts obtained in this invention are assembled on the wheel already with the desired colour and varnish is invisible in the bonding line between them in the final varnishing treatment.

Precisely, the nature and the low thickness of the materials used make the connecting line between the several varnishes already varnished is invaluable, which is an aesthetic requirement for the steering wheels or interior parts of high-end car. This is another further advantage of the method of this invention.

DESCRIPTION OF THE FIGURES

In order to aid in a better understanding of this invention, the following figures are included with illustrative and non-limiting character.

DETAILED DESCRIPTION OF THE INVENTION

In order to provide a better understanding of this invention, a preferred embodiment is explained in detail as follow. The figures presented illustrate some of the steps of the method.

Figure 1:
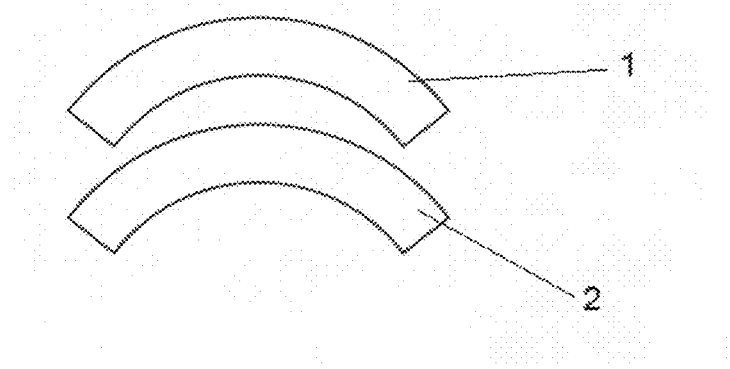
FIG. 1: shows a cut-away view of the first and second fabrics used in the method of this invention.
Figure 2:
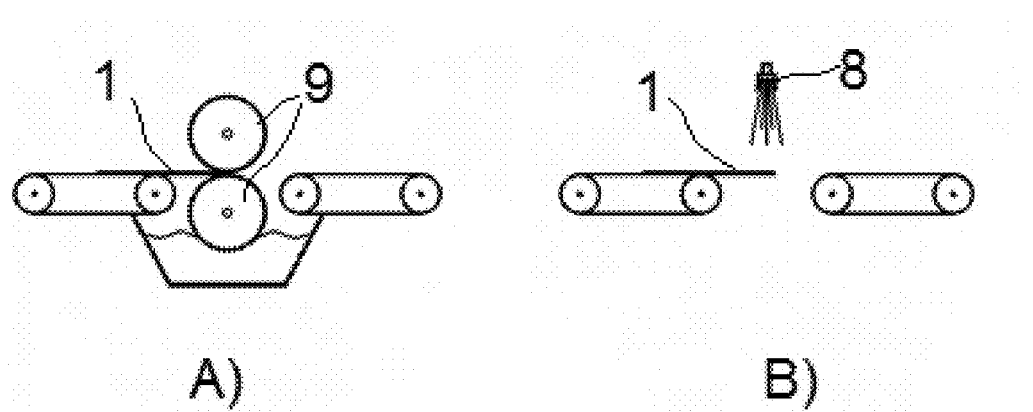
FIG. 2: A) shows a schematic view of impregnation # with water-based resin in the fabrics by means of rollers, B) shows a schematic view of the water-based resin deposition on the fabrics by spray.

In order to cover a steering wheel (5) of a car, a trim is prepared by cutting insoles of a first jute fabric (1) of 0.65 mm thick and a second natural cotton fabric (2) of 0.1 mm of thickness. The insoles have the appropriate size and shape to trim the steering wheel. Subsequently, a water-based acrylic adhesive resin with pH 3.5 is impregnated in each of the fabrics, either by rollers (9) or by spray (8) (see FIG. 2). In general, by means of rollers a greater or deeper impregnation of the resin is achieved in the fabrics.

Once the resin is impregnated, it is allowed to dry at 40° C. for a time varying between 30 minutes and 48 hours.

The two fabrics are then pressed in a hot plate press at a temperature of 255° C. for 10 seconds. In this way, a pressed structure (3) is formed that comprises the first (1) and second fabrics (2).

Figure 3:
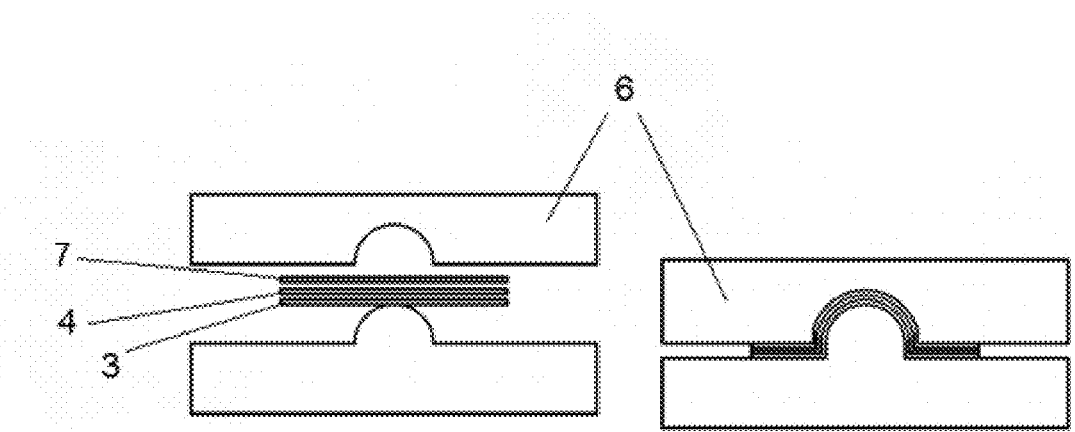
FIG. 3 shows a schematic view of a hot plate press used in the forming process of this invention (before and after the forming).

The structure is then formed into a hot platen press (6) in the shape of the workpiece (see FIG. 3). To this end, a layer (4) of acrylic, polyurethane or water-based or solvent-based epoxy adhesive is added to the structure (3) formed in the previous step and, on the adhesive (4), a wooden decorative sheet (7) of 0.5 mm and the required shape is given to the structure in a hot plate press (6) at 110° C. for 350 seconds.

Figure 4:
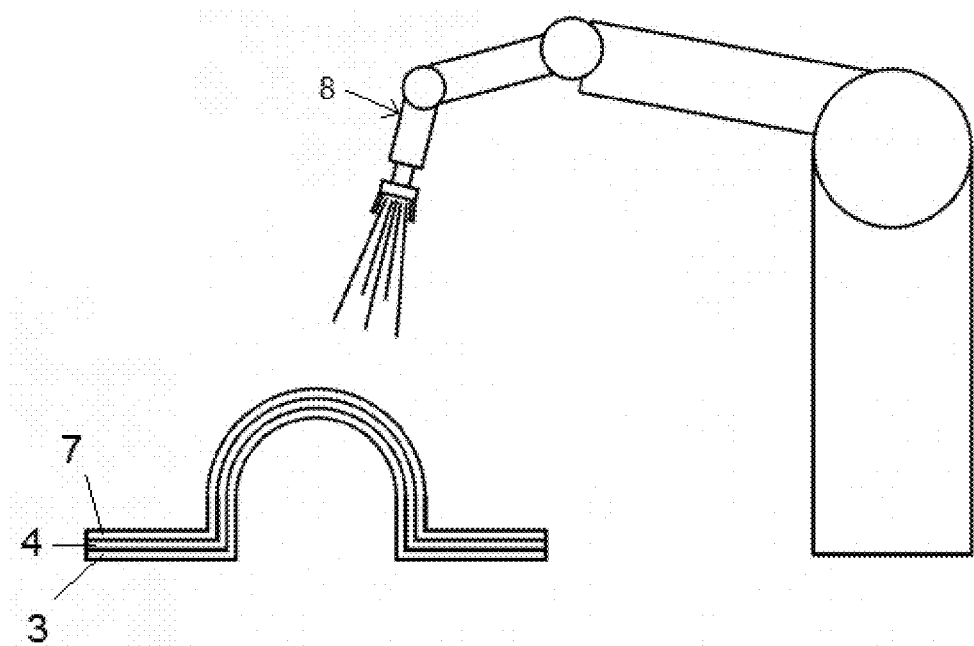
FIG. 4 shows a schematic view of a primer robot used in the pressing and forming process of this invention.

Then an acrylic, polyurethane or solvent-based or water-based epoxy primer is applied by means of a primer robot 8 (see FIG. 4) on the wooden sheet (7) of the structure formed in the previous step. Subsequently, drying is performed at a temperature between 18-30° C.

Three layers of varnish are applied to the primer layer as follows:

a first layer of varnish and allowed to dry for one hour between 18-25° C., a second coat of varnish and allowed to dry for two hours between 18-25° C., a third layer of varnish and allowed to dry for three hours between 18-25° C.

Finally, the formed trim is placed in the oven for 10 hours at a temperature around 85° C. to completely dry the varnish.

Once dry, the trim is cut if on material according to the part to be trimmed, in this case, the steering wheel (5) of a car.

Figure 5:
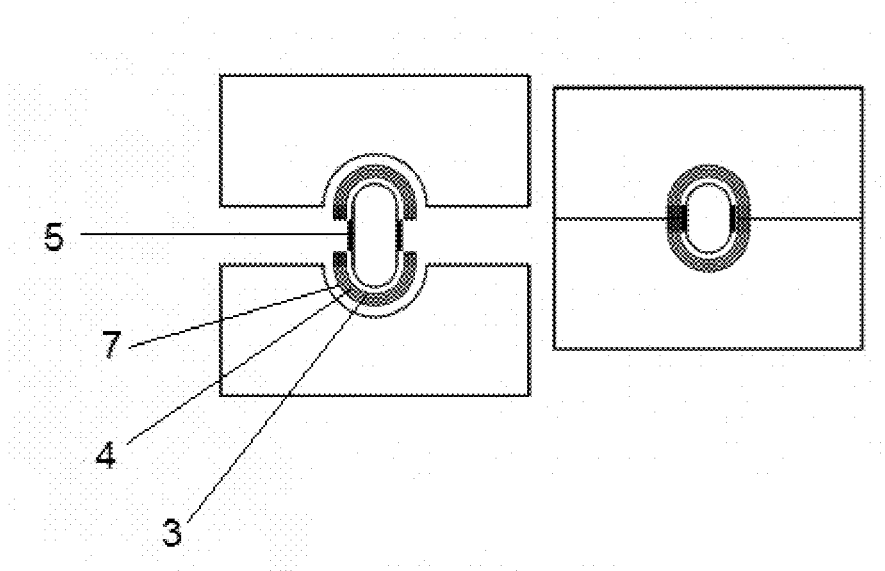
FIG. 5 shows a schematic view of the coating assembly of this invention in a steering wheel by a hot plate press (a section of the steering wheel is shown).

To assemble the trim on the steering wheel (5), it is glued on the wheel by a hot plate press at a temperature of about 110° C. In FIG. 5 the trim assembly on the steering wheel is shown in the wheel (5). In this case, two trim pieces would be needed in order to trim the front and back of the steering wheel.

To the trim already assembled in the steering wheel, it is applied 3 layers of varnish as follows:

a first layer of varnish and allowed to dry for one hour between 18-25° C.

a second coat of varnish and allowed to dry for one hour between 18-25° C.

a third coat of varnish and allowed to dry for one hour between 18-25° C.

Finally, the trim is sanded and polished in a polishing robot, thus obtaining the final trimmed steering wheel.

The invention claimed is:

1. A method for trim preparation of car interior parts characterized by the following steps:

cutting a first fabric (1) made of jute or natural linen and a second fabric (2) made of natural cotton or fibrous paper formed by cellulose and synthetic multi-directional microfibers, wherein the cut is made in an appropriate size and shape to the part to be trimmed;

impregnating the first fabric (1) and the second fabric (2) or fibrous paper with an aqueous based adhesive resin and drying them;

pressing the impregnated first fabric (1) and the impregnated second fabric (2) or fibrous paper together to form a pressed structure (3) comprising the first fabric (1) and the second fabric (2) or fibrous paper;

adding an adhesive layer on one of the faces of the pressed structure (3) and adding a decorative sheet (7) on the adhesive layer and forming a formed structure in a required shape of the part to be trimmed;

applying a primer layer to the decorative sheet (7) of the formed structure and drying the primer layer;

applying at least one layer of varnish onto the primer layer and drying the varnish;

wherein, the adhesive layer is acrylic, polyurethane, solvent-based epoxy or water-based epoxy; the forming is carried out in a press with hot-plate press (6) at temperatures between 100° C. and 120° C., and the thickness of the decorative sheet varies between 0.2 and 0.6 mm.

2. The method of claim 1, wherein the thickness of the first fabric (1) ranges from 0.1 to 0.8 mm and the thickness of the second fabric (2) or the fibrous paper ranges from 0.05 mm to 0.1 mm.

3. The method of claim 1, wherein the decorative sheet is made of wood, carbon fiber or plastic material and its thickness varies between 0.2 and 0.6 mm.

4. The method of claim 1, wherein the first fabric (1) and the second fabric (2) or the fibrous paper are impregnated with aqueous based adhesive resin by spray (8) and/or by rollers (9).

5. The method of claim 1, wherein the aqueous based adhesive resin is an acrylic, vinyl, polyurethane or epoxy resin.

6. The method of claim 1, wherein the drying of the adhesive resin is carried out between 30° C. and 50° C.

7. The method of claim 1, wherein the pressing step is carried out in a hot plate press at temperatures between 245° C. and 265° C.

8. The method of claim 1, wherein the primer is acrylic, polyurethane, solvent-based epoxy or water-based epoxy.

9. The method of claim 1, wherein the drying step of the primer layer is carried out at a temperature between 18-25° C.

10. The method of claim 1, wherein the drying of the varnish is carried out in an oven at temperatures between 10 and 110° C. and during 1 and 10 hours.

11. The method of claim 1, wherein subsequent to the application and drying of at least one varnish layer, a cutting step is carried out to remove surpluses of material.

* * * * *